US012734088B2

(12) United States Patent
Sherman et al.

(10) Patent No.: US 12,734,088 B2
(45) Date of Patent: Sep. 15, 2026

(54) PERSONAL LIFTING ASSEMBLY

(71) Applicant: AMP Performance LLC, Rochester, NY (US)

(72) Inventors: Kim L. Sherman, Pittsford, NY (US); Dean Sisson, Pittsford, NY (US)

(73) Assignee: AMP Performance LLC, Rochester, NY (US)

( * ) Notice: Subject to any disclaimer, the term of this patent is extended or adjusted under 35 U.S.C. 154(b) by 0 days.

(21) Appl. No.: 19/068,500

(22) Filed: Mar. 3, 2025

(65) Prior Publication Data

US 2025/0295537 A1 Sep. 25, 2025

Related U.S. Application Data

(60) Provisional application No. 63/569,398, filed on Mar. 25, 2024.

(51) Int. Cl.
*A61G 7/10* (2006.01)

(52) U.S. Cl.
CPC ......... *A61G 7/1021* (2013.01); *A61G 7/1017* (2013.01)

(58) Field of Classification Search
CPC ...... A61G 7/10; A61G 7/1013; A61G 7/1017; A61G 7/1019; A61G 7/1021; A47G 2009/003
See application file for complete search history.

(56) References Cited

U.S. PATENT DOCUMENTS

| | | | | |
|---|---|---|---|---|
| 3,379,411 A | | 4/1968 | Vanderjagt | |
| 3,495,502 A | | 2/1970 | Bousso | |
| 3,843,092 A | * | 10/1974 | Oehler | B62D 53/0864 254/2 R |
| 4,688,760 A | | 8/1987 | Garman | |
| 4,768,239 A | * | 9/1988 | Pauley | A61G 7/1059 4/564.1 |
| 4,786,032 A | * | 11/1988 | Garman | B66F 3/35 254/122 |

(Continued)

FOREIGN PATENT DOCUMENTS

| | | |
|---|---|---|
| CN | 113003499 A | 6/2021 |
| CN | 114394548 A | 4/2022 |

(Continued)

OTHER PUBLICATIONS

Easy Lift Up (Jan. 22, 2024) "Easy Lift Up personal lifting cushion," retrieved from the Internet <https://easyliftup.com/easy-lift-up-personal-lifting-cushion/>.
Invacare (Jan. 22, 2024) "Invacare Get-U-Up Hydraulic Sit-to-Stand Patient Lift, 350 lb. Weight Capacity, GHS350," retrieved from Internet <https://shop.invacare.com/products/invacare-get-u-up-hydraulic-sit-to-stand-patient-lift-350-lb-weight-capacity-ghs350?srsltid=AfmBOoqr9WkXy7aDZUn_FhaOak7xLS3dRRBrekRc_vvrBmcbmP2Gsc8D>.

(Continued)

*Primary Examiner* — David E Sosnowski
(74) *Attorney, Agent, or Firm* — Harter Secrest & Emery LLP; Michael Nicholas Vranjes

(57) ABSTRACT

A lifting assembly, including a top plate, a bottom plate, a first pivoting plate assembly including a first plate pivotably connected to the top plate and a second plate pivotably connected to the first plate and the bottom plate, a second pivoting plate assembly including a third plate pivotably connected to the top plate and a fourth plate pivotably connected to third plate and the bottom plate, and a first bladder assembly engaged with the second plate and the bottom plate, the first bladder assembly operatively arranged to be inflated and deflated to displace the top plate with respect to the bottom plate.

19 Claims, 14 Drawing Sheets

(56) References Cited

U.S. PATENT DOCUMENTS

| | | | | | |
|---|---|---|---|---|---|
| 5,067,189 | A | | 11/1991 | Weedling et al. | |
| 5,505,518 | A | | 4/1996 | Pike | |
| 5,577,278 | A | | 11/1996 | Barker et al. | |
| 5,669,086 | A | | 9/1997 | Garman | |
| 5,855,359 | A | | 1/1999 | Chipperfield | |
| 5,918,936 | A | * | 7/1999 | Murphy | A61G 5/14 297/DIG. 8 |
| 6,113,188 | A | | 9/2000 | Stewart et al. | |
| 6,170,210 | B1 | | 1/2001 | Marts | |
| 6,286,812 | B1 | * | 9/2001 | Cherry | B66F 7/065 254/9 C |
| 6,317,909 | B1 | | 11/2001 | Blum | |
| 6,637,818 | B2 | | 10/2003 | Williams | |
| 6,655,905 | B1 | | 12/2003 | Staehlin | |
| 6,834,404 | B2 | | 12/2004 | Fletcher | |
| 6,871,364 | B1 | * | 3/2005 | Leoutsakos | B66F 7/0641 5/81.1 R |
| 6,918,575 | B2 | | 7/2005 | Cadrain et al. | |
| 6,929,249 | B1 | * | 8/2005 | Kim | B66F 3/35 254/93 H |
| 7,032,261 | B2 | | 4/2006 | Heimbrock | |
| 7,070,167 | B1 | | 7/2006 | Bacon et al. | |
| 7,444,693 | B2 | | 11/2008 | Russo et al. | |
| 8,777,238 | B1 | | 7/2014 | Blackwood | |
| 9,056,755 | B1 | | 6/2015 | Moy | |
| 9,629,765 | B1 | * | 4/2017 | Mitchell | A61G 5/1075 |
| 9,675,508 | B2 | * | 6/2017 | Hall | A47C 7/002 |
| 10,596,053 | B1 | | 3/2020 | Street | |
| 10,639,220 | B1 | * | 5/2020 | Smith | A61G 7/1019 |
| 11,191,686 | B2 | | 12/2021 | Werkeiser | |
| 11,198,518 | B1 | | 12/2021 | Knight et al. | |
| 11,608,254 | B2 | | 3/2023 | Kozlenok | |
| 12,643,777 | B2 | * | 6/2026 | Hobbs | B66F 7/20 |
| 2003/0180130 | A1 | | 9/2003 | Lutz | |
| 2004/0068796 | A1 | * | 4/2004 | Fletcher | A61G 7/1003 5/611 |
| 2005/0028875 | A1 | * | 2/2005 | German | F15B 13/08 137/596 |
| 2007/0132282 | A1 | | 6/2007 | Jeans | |
| 2008/0121285 | A1 | | 5/2008 | Weinel | |
| 2008/0134428 | A1 | * | 6/2008 | Call | A61G 7/1021 4/566.1 |
| 2010/0170037 | A1 | | 7/2010 | Fletcher et al. | |
| 2012/0131746 | A1 | * | 5/2012 | Griffin | A61G 7/1026 5/81.1 R |
| 2014/0232156 | A1 | * | 8/2014 | Mills | A61G 7/1011 297/338 |
| 2015/0137567 | A1 | * | 5/2015 | Smith | A61G 5/0858 297/183.1 |
| 2016/0051426 | A1 | | 2/2016 | Hall | |
| 2018/0344556 | A1 | | 12/2018 | Garman et al. | |
| 2019/0307257 | A1 | * | 10/2019 | Wittekind | A47C 20/048 |
| 2020/0170863 | A1 | | 6/2020 | Fuller et al. | |
| 2021/0145680 | A1 | | 5/2021 | Butterworth | |
| 2021/0161743 | A1 | * | 6/2021 | Jenkins | A61G 7/1021 |
| 2022/0219956 | A1 | | 7/2022 | Wakabayashi et al. | |
| 2022/0304878 | A1 | | 9/2022 | Comstock | |

FOREIGN PATENT DOCUMENTS

| | | | | | |
|---|---|---|---|---|---|
| DE | 3942160 | A1 | * | 6/1991 | A61G 5/14 |
| DE | 102006035855 | B4 | | 4/2014 | |
| DE | 202019002365 | U1 | | 6/2019 | |
| EP | 1413280 | A1 | | 4/2004 | |
| EP | 3171736 | B1 | | 4/2019 | |
| EP | 4140461 | A1 | | 3/2023 | |
| GB | 2353272 | A | | 2/2001 | |
| GB | 2428564 | A | | 2/2007 | |
| KR | 101274482 | B1 | | 6/2013 | |
| WO | 2019229730 | A1 | | 12/2019 | |

OTHER PUBLICATIONS

LiftUp Raizer (Jan. 22, 2024) "LiftUp Raizer Mobile Lifting Chair for Safe Patient Handling—Raizer II Lift Chair—103724," Grayline Medical, retrieved from Internet <https://www.graylinemedical.com/products/liftup-raizer-mobile-lifting-chair-for-safe-patient-handling-raizer-ii-lift-chair-.

Liftup Raizer (Jan. 22, 2024) "Raizer Lay Flat Patient Lift Device for Home, Elderly, Lift Chair for Seniors, Lift Assist Seat, Portable Lift Aid—Made in Europe—Safely Helps Lift Adults That Fall Get Up from Floor—Liftup M," retrieved from Internet <https://www.amazon.com/Assist-Elderly-Seniors-Patient-Portable/dp/B08XYCBHH1>.

Mangar Health (Jan. 22, 2024) "ELK Lifting Cushion + Airflo 24," Med+Mart, retrieved from Internet <https://medmartonline.com/mangar-elk-lifting-cushion>.

Personal Cushion Lift (Jan. 22, 2024) "Personal Cushion Lift, Made in USA, New Inflatable Lifting Chair for the Floor," retrieved from Internet <https://www.ebay.com/itm/192370000312>.

RoMedic Standup (Jan. 22, 2024) "SystemRoMedic™ Lifting—StandUp," Amilake, retrieved from Internet <http://www.amilakesouthern.co.uk/products/systemromedic-lifting-standup/>.

Romedic Standup (2015) "Product Leaflet," Handicare, 2 pages.

* cited by examiner

PERSONAL LIFTING ASSEMBLY

CROSS-REFERENCE TO RELATED APPLICATIONS

This application claims the benefit under 35 U.S.C. § 119(e) of U.S. Provisional Application No. 63/569,398, filed Mar. 25, 2024, which application is incorporated herein by reference in its entirety.

FIELD

The present disclosure relates generally to lifting devices and, more particularly, to an improved lifting assembly which can assist a user in rising from or lowering to the floor.

BACKGROUND

It is a relatively common occurrence for people with limited strength or coordination to fall, often without getting injured. While they haven't been injured, they frequently lack the strength and coordination to rise from the floor on their own. If an attending caregiver does not have sufficient strength to assist the individual, a friend or family member may be called, at inconvenient times, to assist the individual. Alternatively, an ambulance may be called, at considerable expense, so that emergency medical technicians (EMTs) can assist the fallen individual. Additionally, lifting people who have fallen can present a substantial physical risk to friends and family as well as workers in healthcare facilities or EMTs who have been called for assistance.

Lifts can be used to lift humans who have fallen, from the floor to a seat height position. However, current lift designs are large and heavy, require access to an electrical wall outlet, have a slow lifting speed, require setup before use, tear-down and pack-up after use, physical effort by the user to raise or lower the lift, and are impossible for any individual user to operate without assistance. Additionally, current lift designs are not flush, or nearly flush, with the floor in their lowermost position or portable.

SUMMARY

The present disclosure is directed to one or more exemplary embodiments of a lifting assembly.

In an exemplary embodiment, the lifting assembly, comprising a top plate, a bottom plate, a first pivoting plate assembly including a first plate pivotably connected to the top plate and a second plate pivotably connected to the first plate and the bottom plate, a second pivoting plate assembly including a third plate pivotably connected to the top plate and a fourth plate pivotably connected to third plate and the bottom plate, and a first bladder assembly engaged with the second plate and the bottom plate, the first bladder assembly operatively arranged to be inflated and deflated to displace the top plate with respect to the bottom plate.

In an exemplary embodiment, the top plate is arranged substantially parallel to the bottom plate. In an exemplary embodiment, the first pivoting plate assembly is connected to the top plate proximate a first side of the top plate, the second pivoting plate assembly is connected to the top plate proximate a second side of the top plate, and the first side is adjacent to the second side. In an exemplary embodiment, the first pivoting plate assembly extends radially outward from a perimeter of the top plate in a collapsed state, and the second pivoting plate assembly extends radially inward from the perimeter of the top plate in the collapsed state. In an exemplary embodiment, the first plate forms a ramp surface in the collapsed state.

In an exemplary embodiment, the lifting assembly further comprises a second bladder assembly engaged with the first plate and the top plate, the second bladder assembly operatively arranged to be inflated and deflated to displace the top plate with respect to the bottom plate. In an exemplary embodiment, the lifting assembly further comprises at least one handle. In an exemplary embodiment, the at least one handle is connected to the top plate. In an exemplary embodiment, the lifting assembly further comprises a guard. In an exemplary embodiment, the lifting assembly further comprises a guard arranged proximate the at least one handle.

In an exemplary embodiment, the first bladder assembly comprises at least one bladder connected to at least one of the second plate and the bottom plate. In an exemplary embodiment, the at least one bladder is at least partially enclosed by a membrane, and the membrane is fixedly secured to the at least one of the second plate and the bottom plate. In an exemplary embodiment, the membrane comprises a lateral wall comprising a hole. In an exemplary embodiment, the at least one bladder is connected to the second plate and/or the bottom plate by a tether. In an exemplary embodiment, the lifting assembly further comprises a pump assembly fluidly connected to the first bladder assembly, the pump assembly operatively arranged to controllably inflate and deflate the first bladder assembly. In an exemplary embodiment, the lifting assembly further comprises one or more rollers rotatably connected to the first plate. In an exemplary embodiment, the lifting assembly further comprises a guard arranged proximate an edge of at least one of the first pivoting plate assembly and the second pivoting plate assembly.

In an exemplary embodiment, the lifting assembly, comprises a top plate, a bottom plate, a first pivoting plate assembly, including a first plate pivotably connected to the top plate proximate a first side of the top plate, and a second plate pivotably connected to the first plate and the bottom plate, a second pivoting plate assembly, including a third plate pivotably connected to the top plate proximate a second side of the top plate, the second side being adjacent to the first side, and a fourth plate pivotably connected to third plate and the bottom plate, and a first bladder assembly engaged with the second plate and the bottom plate, the first bladder assembly operatively arranged to be inflated and deflated to displace the top plate with respect to the bottom plate, wherein the first pivoting plate assembly extends radially outward from a perimeter of the top plate in a collapsed state of the lifting assembly, and the second pivoting plate assembly extends radially inward from the perimeter of the top plate in the collapsed state.

In an exemplary embodiment, the top plate is arranged substantially parallel to the bottom plate. In an exemplary embodiment, the first plate forms a ramp surface in the collapsed state. In an exemplary embodiment, the lifting assembly further comprises a second bladder assembly engaged with the first plate and the top plate, the second bladder assembly operatively arranged to be inflated and deflated to displace the top plate with respect to the bottom plate. In an exemplary embodiment, the lifting assembly further comprises a second bladder assembly engaged with the first plate and the second plate, the second bladder assembly operatively arranged to be inflated and deflated to displace the top plate with respect to the bottom plate.

The present disclosure is directed to one or more exemplary embodiments of a lightweight portable lifting apparatus that serves to raise, from the floor, a physically challenged individual who lacks the ability to do so on their own, potentially due to a lack of strength or coordination. A pump pressurizes one or more bladders that elevate a lifting surface of a Sarrus linkage type structure from floor level to chair height where the individual can more easily rise to a standing position or transfer to another seating surface. The device can also be used to safely lower such a physically challenged individual to the floor when desired, such as for physical therapy or other activity at floor level.

In an exemplary embodiment, the lifting assembly of the present disclosure exhibits one button operation, requires no setup before use, requires no tear-down after use, requires no physical effort by the user or assistant to raise or lower the lift or top plate (i.e., some lifts require an assistant to force the lift down as air is evacuated), comprises a hold-down connector that passively/automatically latches in the down position for transport and passively/automatically releases as the lift is raised. Additionally, in an exemplary embodiment the lifting assembly of the present disclosure comprises a low-profile design that facilitates transport and storage, as well as easy ingress by the user. In an exemplary embodiment, the lifting assembly of the present disclosure may be operated by certain users without assistance from others.

The present disclosure is directed to a lift seat or lifting assembly which can assist a user in rising from or lowering to the floor. The lift seat can benefit the elderly and others who, because of a lack of strength or coordination, are more likely to fall, and if they fall, lack the strength to get up from the floor on their own.

The present disclosure is directed to a lifting device comprising one or more inflatable bladders, within a foldable structure, that may be inflated or deflated to move a lifting panel to a desired height. A person with limited physical abilities, seated on the lifting panel, may be assisted in rising from the floor in order to stand or transfer to another seating surface. Alternatively, the device may be used to safely lower a person to the floor for activities such as exercise or physical therapy.

In an exemplary embodiment, the lifting assembly comprises stacked bladders which may be more effective than a single bladder. In an exemplary embodiment, the pivoting plate assemblies of the present disclosure increase in mechanical advantage as the lift or top plate is raised.

These and other objects, features, and advantages of the present disclosure will become readily apparent upon a review of the following detailed description of the disclosure, in view of the drawings and appended claims.

BRIEF DESCRIPTION OF THE DRAWINGS

The accompanying drawings are incorporated herein as part of the specification. The drawings described herein illustrate embodiments of the presently disclosed subject matter and are illustrative of selected principles and teachings of the present disclosure, in which corresponding reference symbols indicate corresponding parts. However, the drawings do not illustrate all possible implementations of the presently disclosed subject matter and are not intended to limit the scope of the present disclosure in any way.

DETAILED DESCRIPTION

Figure 1A:
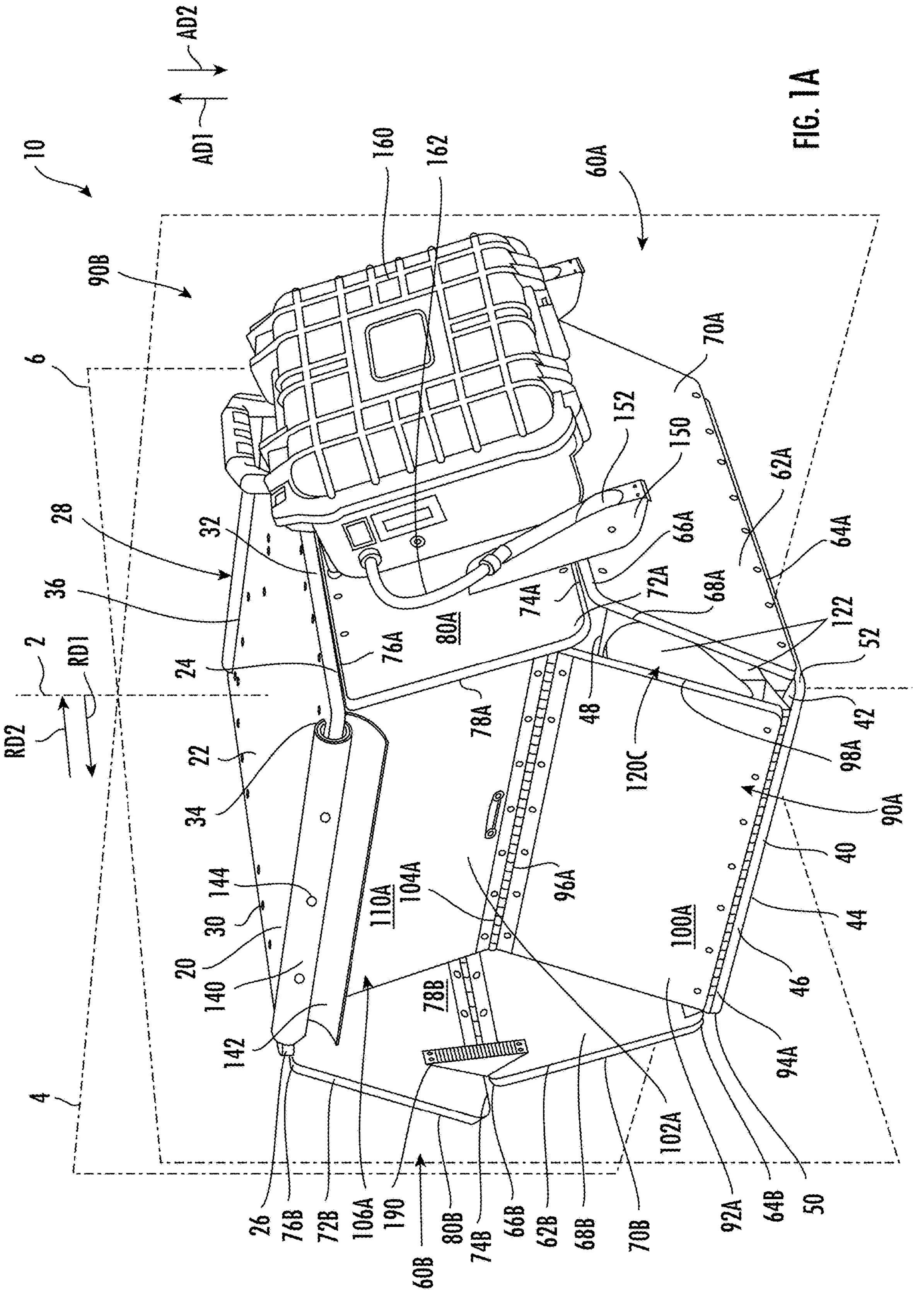
FIG. 1A is a front perspective view of a lifting assembly in an expanded state.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

Where used herein, the terms "first," "second," and so on, do not necessarily denote any ordinal, sequential, or priority relation, but are simply used to more clearly distinguish one element or set of elements from another, unless specified otherwise.

Where used herein, the term "about" when applied to a value is intended to mean within the tolerance range of the equipment used to produce the value, or, in some examples, is intended to mean plus or minus 10%, or plus or minus 5%, or plus or minus 1%, unless otherwise expressly specified.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "substantially" is intended to mean values within ten percent of the specified value.

Where used herein, the term "exemplary" is intended to mean "an example of," "serving as an example," or "illustrative," and does not denote any preference or requirement with respect to a disclosed aspect or embodiment.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element. A similar interpretation is intended when the phrase "used in at least one of:" is used herein.

It should be appreciated that the term "tube" as used herein is synonymous with hose, pipe, channel, conduit, tube end form, or any other suitable pipe flow used in hydraulics and fluid mechanics. It should further be appreciated that the term "tube" can mean a rigid or flexible conduit of any material suitable for containing and allowing the flow of a gas or a liquid.

Figure 1B:
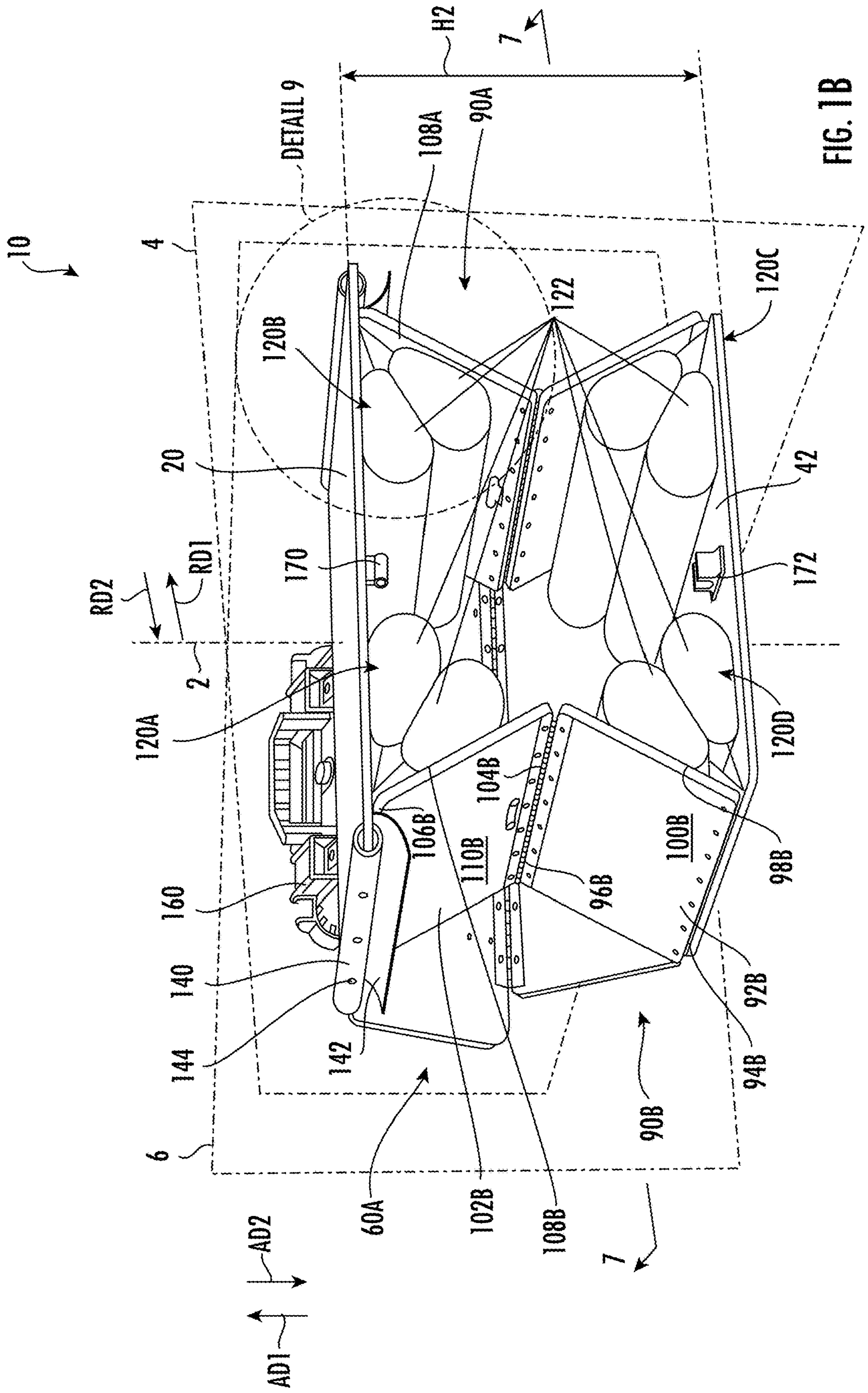
FIG. 1B is a rear perspective view of the lifting assembly shown in FIG. 1A, with a pivoting plate assembly removed.
Figure 2A:
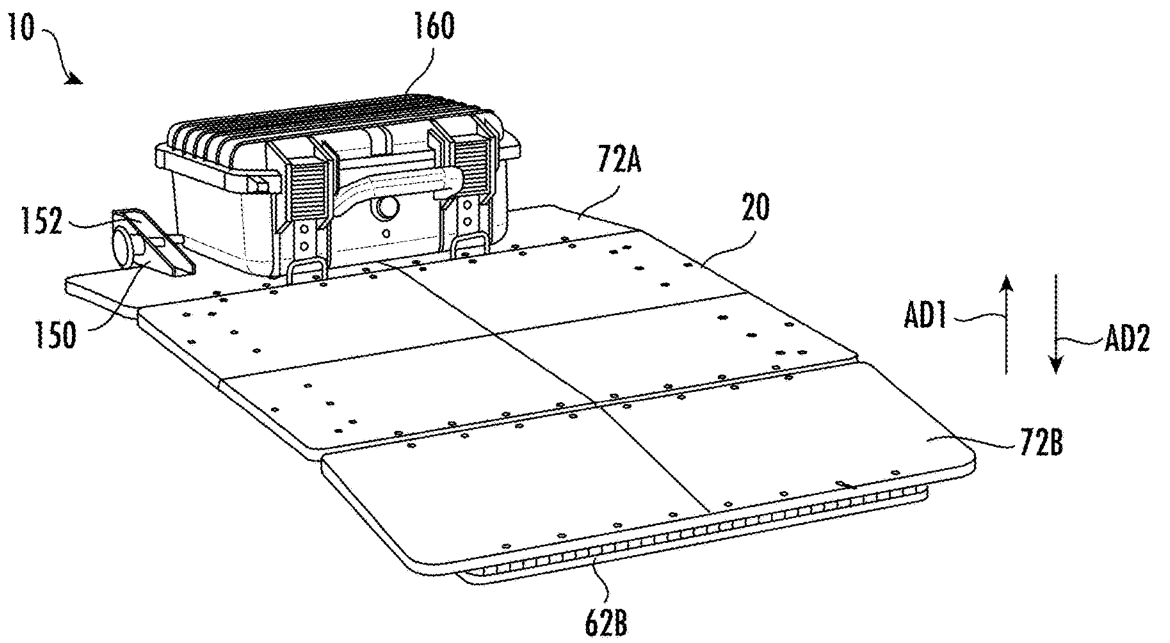
FIG. 2A is a rear perspective view of the lifting assembly shown in FIG. 1A, in a contracted state.
Figure 2B:
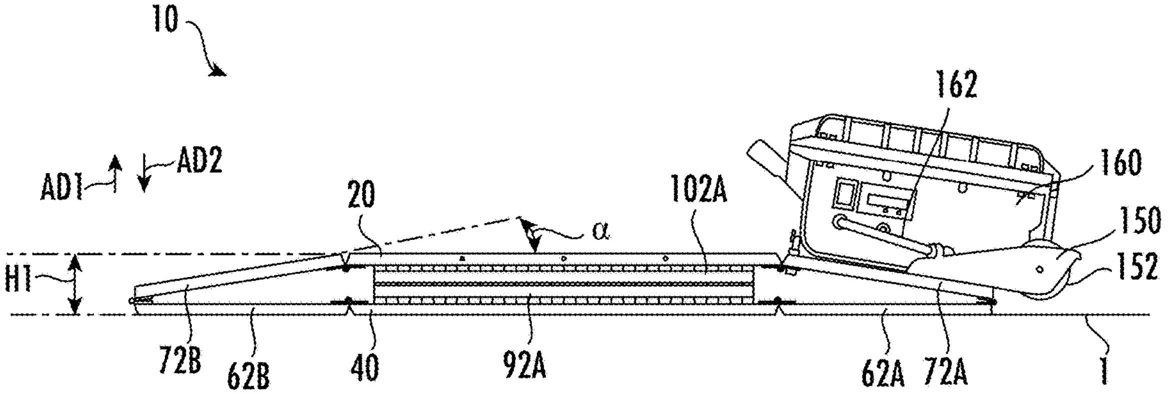
FIG. 2B is a side elevational view of the lifting assembly shown in FIG. 2A.

Adverting now to the figures, FIG. 1A is a front perspective view of lifting assembly 10 in an expanded state. FIG. 1B is a rear perspective view of lifting assembly 10, with pivoting plate assembly 60B removed. FIG. 2A is a rear perspective view of lifting assembly 10, in a contracted or collapsed state. FIG. 2B is a side elevational view of lifting assembly 10. Lifting assembly 10 generally comprises top plate 20, bottom plate 40, at least two pivoting plate assemblies, for example, pivoting plate assemblies 60A, 60B, 90A, and 90B, and at least one bladder assembly, for example, bladder assemblies 120A, 120B, 120C, 120D, 120E, and/or 120F. In an exemplary embodiment, lifting assembly 10 further comprises pump system 160.

Top plate 20 comprises top surface 22, bottom surface 24, side 26, side 28, side 30, and side 32. Top plate 20 is operatively arranged to engage and move user 8. Top plate 20 is displaceable in an axial direction with respect to bottom plate 40. For example, to raise user 8, top plate 20 is displaced in axial direction AD1 with respect to bottom plate 40. To lower user 8, top plate 20 is displaced in axial direction AD2 with respect to bottom plate 40. Bottom plate 40 is arranged to engage a ground surface and comprises top surface 42, bottom surface 44, side 46, side 48, side 50, and side 52.

Figure 14:
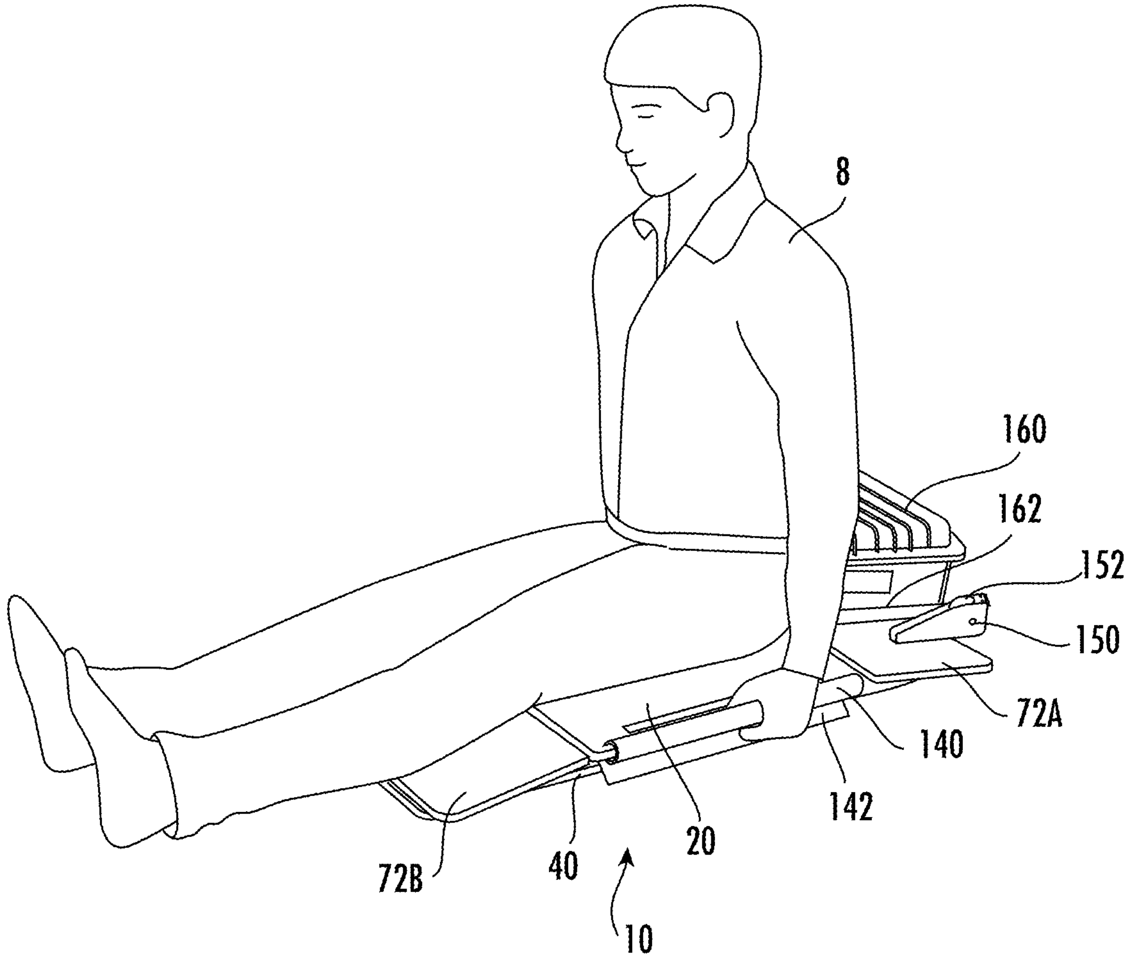
FIG. 14 is a perspective view of a user on the lifting assembly shown in FIG. 1A in the contracted state.
Figure 15:
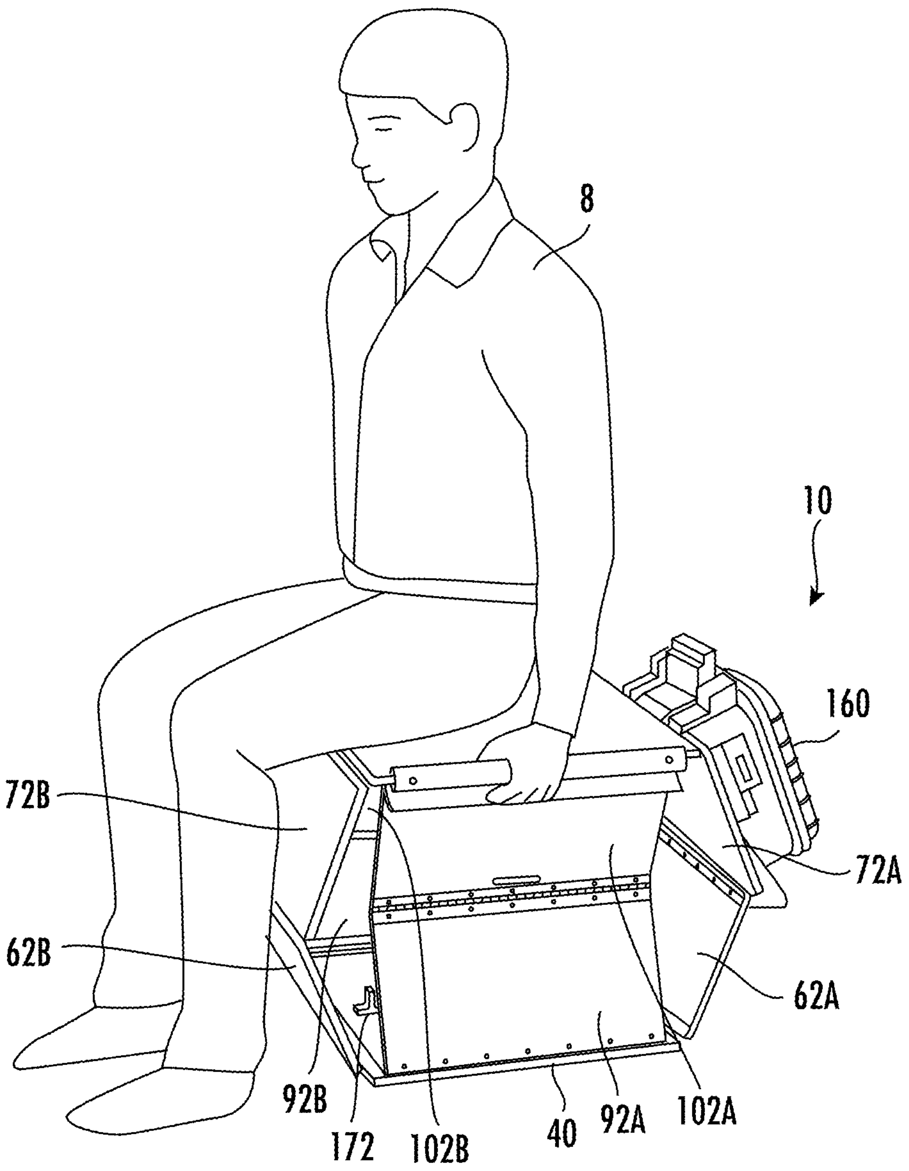
FIG. 15 is a perspective view of a user on the lifting assembly shown in FIG. 1A in the expanded state.

In an exemplary embodiment, lifting assembly 10 further comprise one or more handles 140 connected to at least one plate. Handle 140 is operatively arranged to provide a support for user 8 during use of lifting assembly 10, as best shown in FIGS. 14-15. In the embodiment shown, handles 140 are connected to top plate 20. For example, handle 140 may be a tube that engages hole or slot 34, 36 of top plate 20. In another example, handle 140 may be a slotted tube that slides around the edge of top plate 20 and is fastened to side 26, 28 by screw fasteners 144. In an exemplary embodiment, lifting assembly 10 further comprises one or more guards or shields 142 arranged proximate handles 140 to prevent a user's hands from being pinched between plates, specifically, plates 92A and 102A of pivoting plate assembly 90A and plates 92B and 102B of pivoting plate assembly 90B. Guards 142 may be fixedly secured to top plate 20, for example, at bottom surface 24. In an exemplary embodiment, guards 142 are arranged proximate side 26, 28 or proximate the upper hinge of pivoting plate assembly 90A, 90B to protect the user's fingers from being pinched between plates 92A, 92B and 102A, 102B.

Pivoting plate assembly 60A comprises plate 62A and plate 72A. Plate 62A comprises end 64A, end 66A, inner surface 68A, and outer surface 70A. End 64A is pivotably connected to bottom plate 40, for example, at surface 42 or at or proximate side 52. End 66A is pivotably connected to plate 72A. Plate 72A comprises end 74A, end 76A, inner surface 78A, and outer surface 80A. End 74A is pivotably connected to plate 62A, for example, at end 66A. End 76A is pivotably connected to top plate 20, for example, at surface 24 or at or proximate side 32. Pivoting plate assembly 60A is operatively arranged to pivot radially outward in radial direction RD1. Put another way, as top plate 20 is displaced in axial direction AD2 with respect to bottom plate 40, ends 68A and 74A are displaced radially outward in radial direction RD1. As top plate 20 is displaced in axial direction AD1 with respect to bottom plate 40, ends 68A and 74A are displaced radially inward in radial direction RD2.

Pivoting plate assembly 60B comprises plate 62B and plate 72B. Plate 62B comprises end 64B, end 66B, inner surface 68B, and outer surface 70B. End 64B is pivotably connected to bottom plate 40, for example, at surface 42 or at or proximate side 50. End 66B is pivotably connected to plate 72B. Plate 72B comprises end 74B, end 76B, inner surface 78B, and outer surface 80B. End 74B is pivotably connected to plate 62B, for example, at end 66B. End 76B is pivotably connected to top plate 20, for example, at surface 24 or at or proximate side 30. Pivoting plate assembly 60B is operatively arranged to pivot radially outward in radial direction RD1. Put another way, as top plate 20 is displaced in axial direction AD2 with respect to bottom plate 40, ends 66B and 74B are displaced radially outward in radial direction RD1. As top plate 20 is displaced in axial direction AD1 with respect to bottom plate 40, ends 66B and 74B are displaced radially inward in radial direction RD2.

Pivoting plate assembly 90A comprises plate 92A and plate 102A. Plate 92A comprises end 94A, end 96A, inner surface 98A, and outer surface 100A. End 94A is pivotably connected to bottom plate 40, for example, at surface 42 or at or proximate side 46. End 96A is pivotably connected to plate 102A. Plate 102A comprises end 104A, end 106A, inner surface 108A, and outer surface 110A. End 104A is pivotably connected to plate 92A, for example, at end 96A. End 106A is pivotably connected to top plate 20, for example, at surface 24 or at or proximate side 26. Pivoting plate assembly 90A is operatively arranged to pivot radially inward in radial direction RD2. Put another way, as top plate 20 is displaced in axial direction AD2 with respect to bottom plate 40, ends 96A and 104A are displaced radially inward in radial direction RD2. As top plate 20 is displaced in axial direction AD1 with respect to bottom plate 40, ends 96A and 104A are displaced radially outward in radial direction RD1.

Pivoting plate assembly 90B comprises plate 92B and plate 102B. Plate 92B comprises end 94B, end 96B, inner surface 98B, and outer surface 100B. End 94B is pivotably connected to bottom plate 40, for example, at surface 42 or at or proximate side 48. End 96B is pivotably connected to plate 102B. Plate 102B comprises end 104B, end 106B, inner surface 108B, and outer surface 110B. End 104B is pivotably connected to plate 92B, for example, at end 96B. End 106B is pivotably connected to top plate 20, for example, at surface 22 or at or proximate side 28. Pivoting plate assembly 90B is operatively arranged to pivot radially inward in radial direction RD2. Put another way, as top plate 20 is displaced in axial direction AD2 with respect to bottom plate 40, ends 96B and 104B are displaced radially inward in radial direction RD2. As top plate 20 is displaced in axial direction AD1 with respect to bottom plate 40, ends 96B and 104B are displaced radially outward in radial direction RD1.

Figure 16:
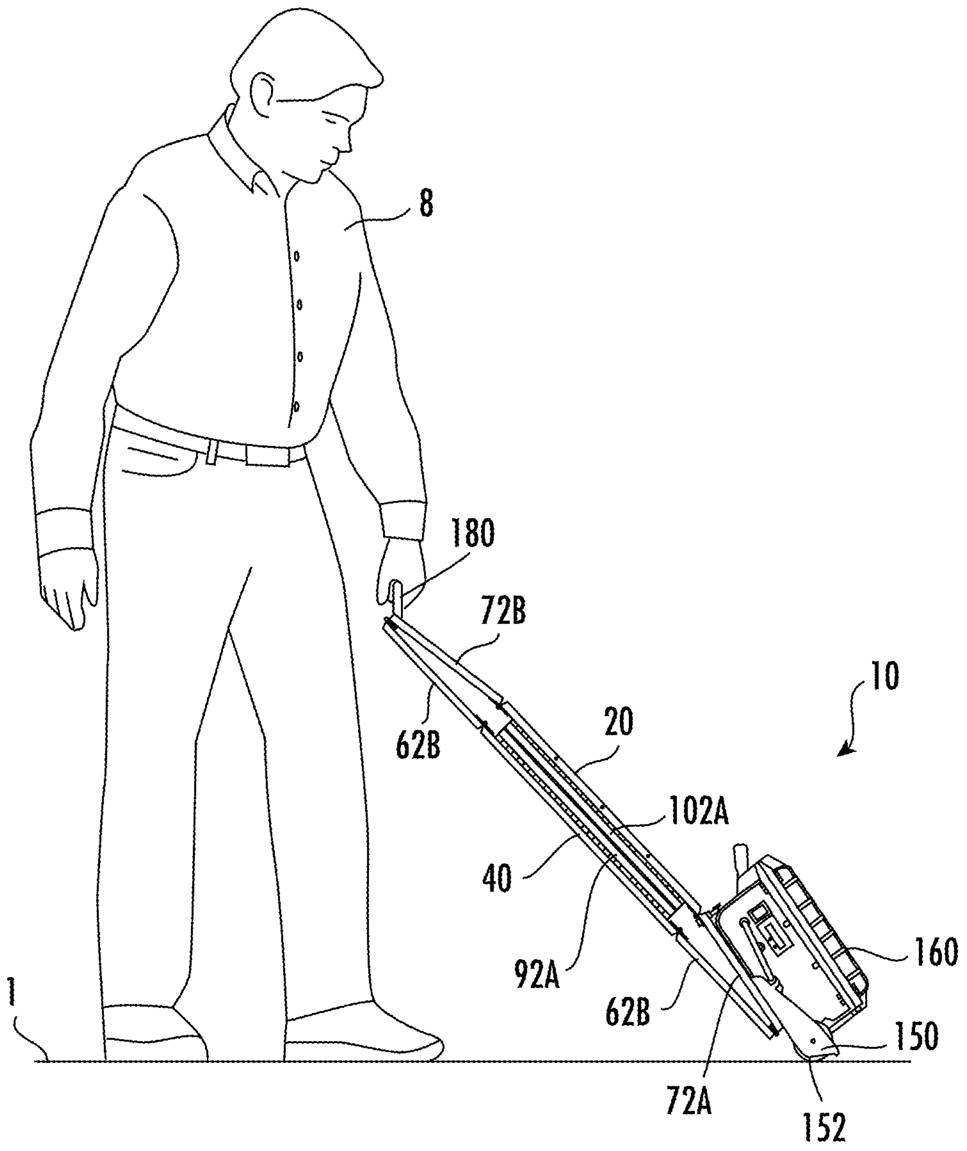
FIG. 16 is a side elevational view of a user transporting the lifting assembly shown in FIG. 1A, in the contracted state.

In an exemplary embodiment, lifting assembly 10 further comprises one or more wheels 152 rotatably connected to a plate. Wheels 152 may be rotatably connected to a plate via bracket 150. In the embodiment shown, two brackets 150 and corresponding wheels 152 are connected to plate 72A. It should be appreciated that the brackets 150 and wheels 152 may be connected to plate 72B. In an exemplary embodiment, and as best shown in FIG. 16, lifting assembly 10 may further comprise handle 180 for user 8 to transport lifting assembly 10. Handle 180 is connected to a plate opposite the plate at which wheels 152 are connected, for example, plate 72B.

In an exemplary embodiment, lifting assembly 10 further comprises male connector 170 and female connector 172 operatively arranged to engage the male connector 170 to maintain lifting assembly 10 in a contracted state. For example, and as best shown in FIG. 1B, male connector 170 is arranged on one of top plate 20 and bottom plate 40 and female connector 172 is arranged on the other of top plate 20 and bottom plate 40. In an exemplary embodiment, lifting assembly 10 comprises passive connectors to maintain lifting assembly 10 in a contracted state, for example, magnets, detents, hook and loop fastener, and the like. In an exemplary embodiment, the connection means of the present disclosure passively latches when lifting assembly 10 is lowered for transport and passively releases as lifting assembly 10 is raised, with no additional action required by the user.

As shown in FIGS. 1A-1B, in an expanded state, lifting assembly 10 comprises height H2. As shown in FIG. 2B, in a contracted state, lifting assembly 10 comprises height H1, which is less than H2. In the contracted state, plate 72B (and/or plate 72A) is arranged at angle α with respect to ground surface 1. Angle α is an acute angle and should be as small as possible such that user 8 can easily slide onto the contracted lifting assembly 10, for example 9°. In an exemplary embodiment, plates 40, 62A, and 62B are aligned linearly in the contracted state, which provides greater stability when user 8 is attempting to get onto plate 20.

Bladder assembly 120A, 120B, 120C, 120D are arranged between the plates of pivoting plate assemblies 90A and 90B.

Bladder assembly 120A comprises one or more bladders 122 and is arranged between plate 102B and plate 20. Specifically, bladder assembly 120B engages bottom surface 24 and inner surface 108B.

Bladder assembly 120B comprises one or more bladders 122 and is arranged between plate 102A and plate 20. Specifically, bladder assembly 120B engages bottom surface 24 and inner surface 108A. Bladder assembly 120C comprises one or more bladders 122 and is arranged between plate 92A and plate 40. Specifically, bladder assembly 120C engages top surface 42 and inner surface 98A. Bladder assembly 120D comprises one or more bladders 122 and is arranged between plate 92B and plate 40. Specifically, bladder assembly 120*d* engages top surface 42 and inner surface 98B. Bladders 122 are operatively arranged to be inflated and deflated to expand and contract lifting assembly 110. For example, as bladders 122 are inflated, top plate 20 is displaced in axial direction AD1 with respect to bottom plate 40. As bladders 122 are deflated (i.e., fluid is gradually removed therefrom by pump system 160), top plate 20 is displaced in axial direction AD2 with respect to bottom plate 40. It should be appreciated that, while FIG. 1B illustrates two bladders per bladder assembly, in some embodiments each bladder assembly may have only one bladder. Adding more bladders to a bladder assembly increases the lifting force of lifting assembly 10. In an exemplary embodiment, the bladder assembly comprises stacked bladders which may increase the surface contact area between a bladder and the contacted plate and result in greater lifting force of lifting assembly 10. In the embodiment shown in FIGS. 1A-2B, bladder assemblies 120A-120D are arranged internal to lifting assembly 10, which adds protection to the bladder assemblies from external forces.

Figure 3:
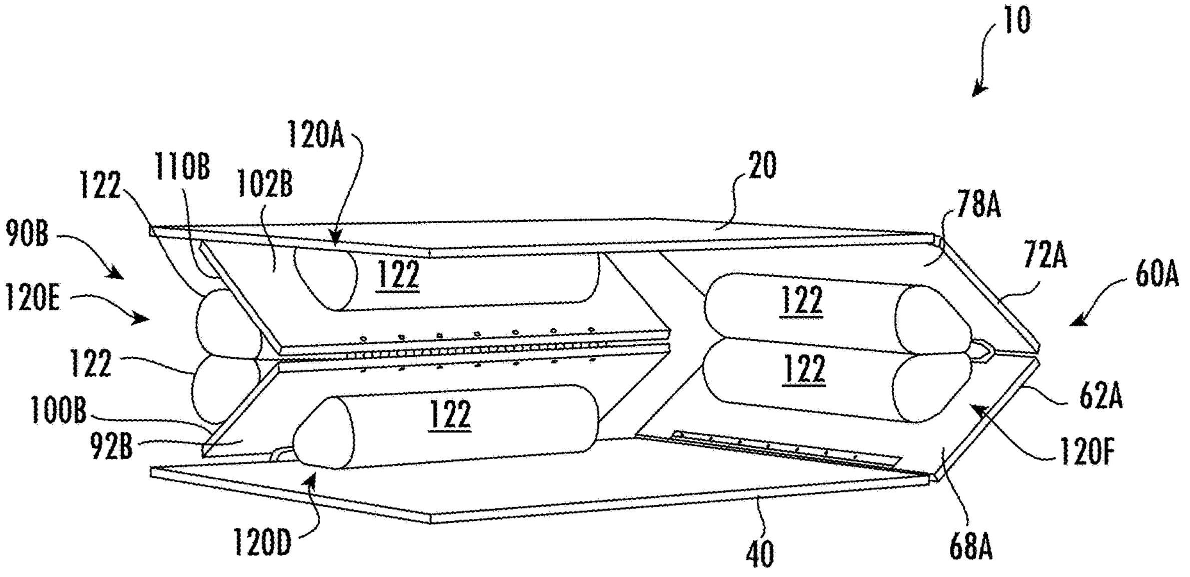
FIG. 3 is a perspective view of a second embodiment of a lifting assembly in an expanded state.

FIG. 3 is a perspective view of a second embodiment of lifting assembly 10 in an expanded state. As shown, lifting assembly 10 may further comprise bladder assembly 120E arranged external to lifting assembly 10. Bladder assembly 120E comprises one or more bladders 122 and is arranged between plate 102B and plate 92B. Specifically, bladder assembly 120E engages outer surface 100B and outer surface 110B. Lifting assembly 10 may further comprise bladder assembly 120F arranged in radially outward extending pivoting plate assembly 60A. Bladder assembly 120F comprises one or more bladders 122 and is arranged between plate 72A and plate 62A. Specifically, bladder assembly 120F engages inner surface 78A and inner surface 68A.

Figure 4:
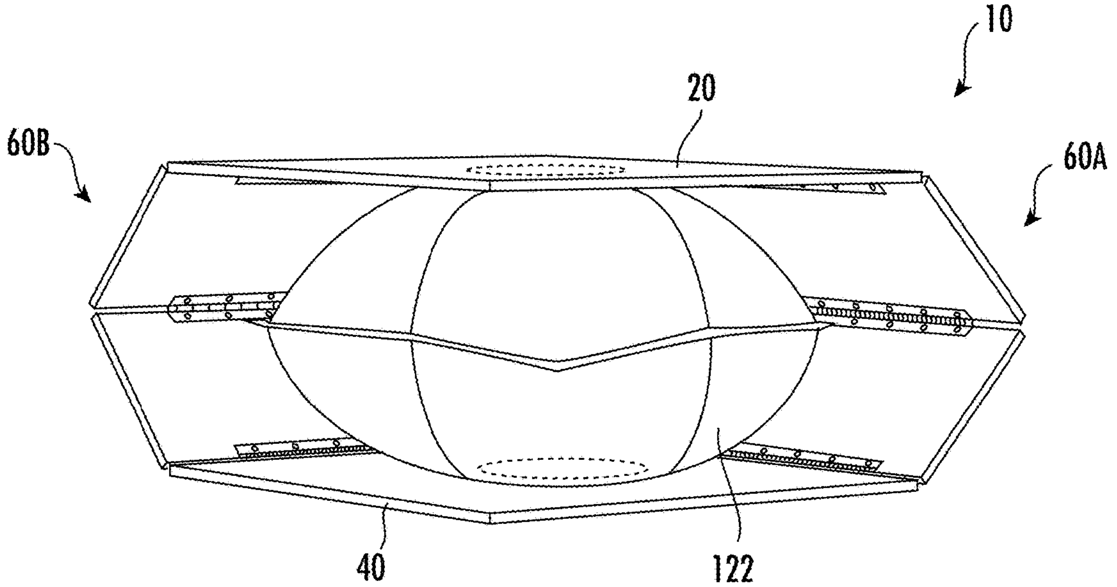
FIG. 4 is a perspective view of a third embodiment of a lifting assembly in an expanded state.

FIG. 4 is a perspective view of a third embodiment of lifting assembly 10 in an expanded state. In the third embodiment, lifting assembly 10 comprises at least two radially outward extending pivoting plate assemblies 60A-60B adjacently arranged, and bladder 122. Bladder 122 engages top plate 20 and bottom plate 40.

Figure 5:
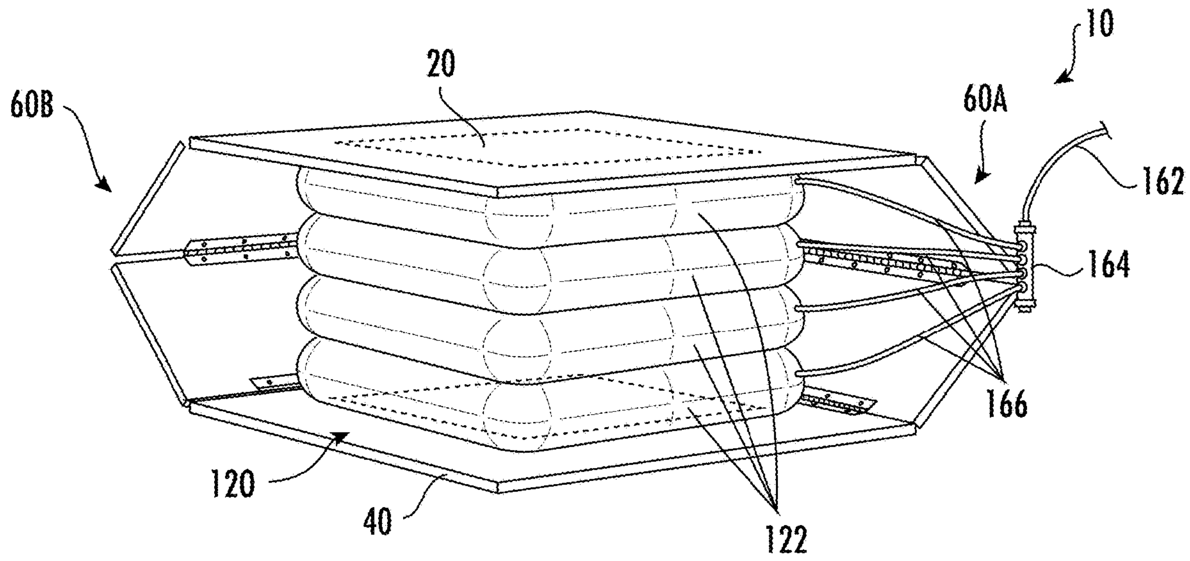
FIG. 5 is a perspective view of a fourth embodiment of a lifting assembly in an expanded state.

FIG. 5 is a perspective view of a fourth embodiment of lifting assembly 10 in an expanded state. In the fourth embodiment, lifting assembly 10 comprises at least two radially outward extending pivoting plate assemblies 60A-60B adjacently arranged, and bladder assembly 120 including a plurality of bladders 122. Bladders 122 are stacked on top of each other with each bladder 122 being independently expanded and contracted (i.e., inflated and deflated) via tubes 166. The top bladder 122 engages top plate 20 and the bottom bladder 122 engages bottom plate 40. Tubes 166 may be connected to manifold 164, which is connected to pump system 160 via tube 162. It should be appreciated that the arrangement of multiple, stacked or adjacently arranged, bladders may increase the lifting force of lifting assembly 10. It should be appreciated that in an exemplary embodiment lifting assembly 10 may comprise radially inward extending pivoting plate assemblies (e.g., one, two, three, or four).

Figure 6:
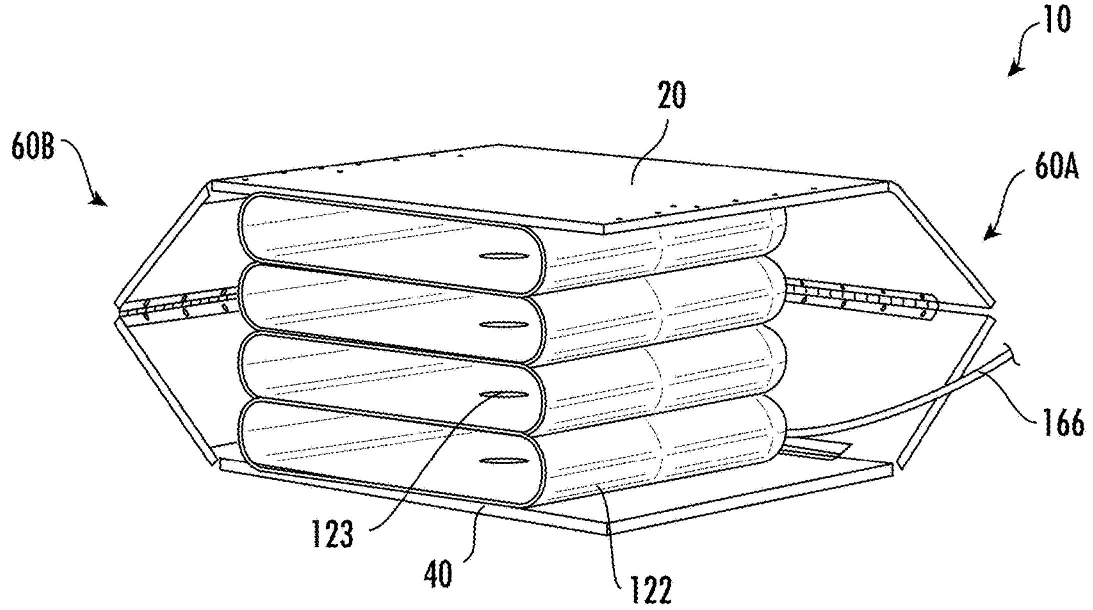
FIG. 6 is a perspective view of a fifth embodiment of a lifting assembly in an expanded state.

FIG. 6 is a perspective view of a fifth embodiment of lifting assembly 10 in an expanded state. In the fifth embodiment, lifting assembly 10 comprises at least two radially outward extending pivoting plate assemblies 60A-60B adjacently arranged, and bladders 122. Bladder 122 comprises a plurality of chambers fluidly connected via hole or holes 123 with all of the chambers being expanded and contracted (i.e., inflated and deflated) via tube 166. The top chamber of bladder 122 engages top plate 20 and the bottom chamber of bladder 122 engages bottom plate 40. Tube 166 may be connected to pump system 160.

Figure 7:
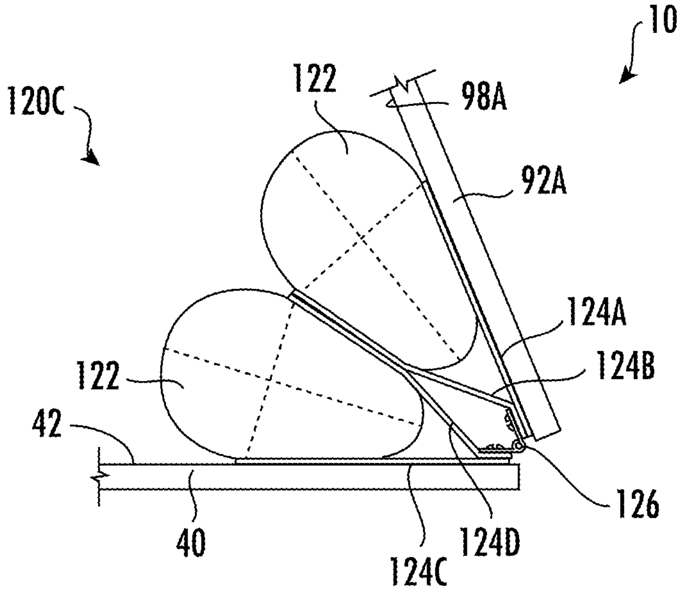
FIG. 7 is a partial cross-sectional view of the lifting assembly taken generally along line 7-7 in FIG. 1B, showing a first embodiment of a bladder assembly.

FIG. 7 is a partial cross-sectional view of lifting assembly 10 taken generally along line 7-7 in FIG. 1B, showing a first embodiment of bladder assembly 120C. As shown, bladder assembly 120C comprises a plurality of bladders, for example two bladders 122, arranged between plate 92A and bottom plate 40. A first bladder 122 engages inner surface 98A and is connected to plate 92A and/or hinge 126 via tether 124A and tether 124B. Tethers 124A-124B are fixedly secured to first bladder 122 via any suitable means, for example, adhesive. In an exemplary embodiment, tethers 124A-124B are secured to plate 92A via one or more fasteners of hinge 126. A second bladder 122 engages the first bladder 122 and top surface 42, and is connected to bottom plate 40 and/or hinge 126 via tether 124C and tether 124D. Tethers 124C-124D are fixedly secured to second bladder 122 via any suitable means, for example, adhesive. In an exemplary embodiment, tethers 124C-124D are secured to bottom plate 40 via one or more fasteners of hinge 126.

Figure 8:
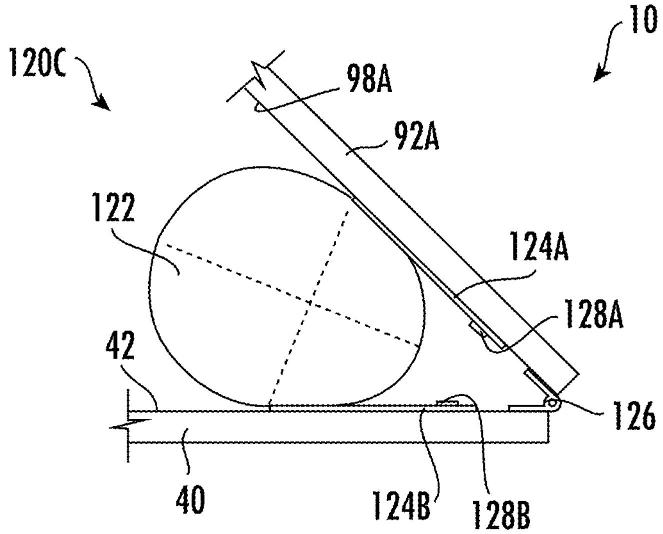
FIG. 8 is a partial cross-sectional view of the lifting assembly taken generally along line 7-7 in FIG. 1B, showing a second embodiment of a bladder assembly.

FIG. 8 is a partial cross-sectional view of lifting assembly 10 taken generally along line 7-7 in FIG. 1B, showing a second embodiment of bladder assembly 120C. As shown, bladder assembly 120C comprises one bladder 122 arranged between plate 92A and bottom plate 40. Bladder 122 engages inner surface 98A and top surface 42, and is connected to at least one of plate 92A and bottom plate 40 via one or more tethers, for example, tether 124A-124B. Tethers 124A-124B are fixedly secured to bladder 122 via any suitable means, for example, adhesive. In an exemplary embodiment, tether 124A is secured to plate 92A via fastener 128A and tether 124B is secured to bottom plate 40 via fastener 128B.

Figure 9:
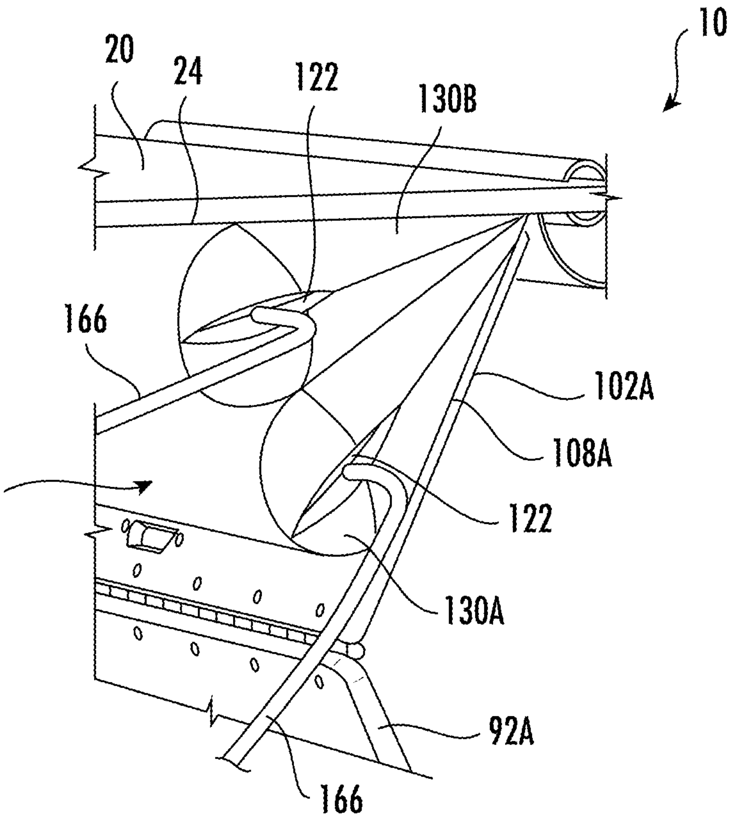
FIG. 9 is a detailed view of the lifting assembly taken generally along DETAIL 9 in FIG. 1B, showing a third embodiment of a bladder assembly.
Figure 10:
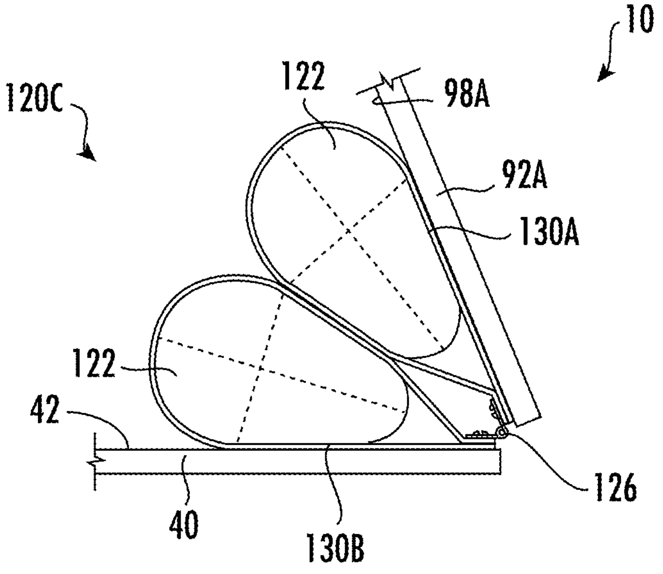
FIG. 10 is a partial cross-sectional view of the lifting assembly taken generally along line 7-7 in FIG. 1B, showing the third embodiment of a bladder assembly.

FIG. 9 is a detailed view of lifting assembly 10 taken generally along DETAIL 9 in FIG. 1B, showing a third embodiment of bladder assembly 120C. FIG. 10 is a partial cross-sectional view of lifting assembly 10 taken generally along line 7-7 in FIG. 1B, showing the third embodiment of bladder assembly 120C. As shown, bladder assembly 120C comprises one or more bladders 122 connected to one or more plates 20, 102A, 92A, 40 via membranes or bags or enclosures 130B. As best shown in FIG. 10, a first bladder 122 is at least partially enclosed by membrane 130A, which is connected to plate 98A and/or hinge 126 via a fastener, adhesive or the like. A second bladder 122 is at least partially enclosed by membrane 130B, which is connected to bottom plate 40 and/or hinge 126 via a fastener, adhesive or the like. Membrane 130A, 130B may comprise a hole in a lateral wall thereof such that tube 166 may be connected to bladder 122 to inflate and deflate bladder 122. The hole in the lateral wall also allows bladder 122 to be removable from membrane 130A, 130B.

Figure 11:
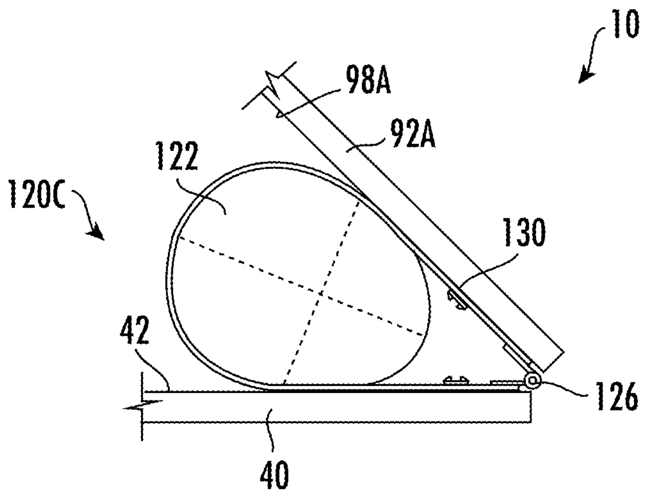
FIG. 11 is a partial cross-sectional view of the lifting assembly taken generally along line 7-7 in FIG. 1B, showing a fourth embodiment of a bladder assembly.

FIG. 11 is a partial cross-sectional view of lifting assembly 10 taken generally along line 7-7 in FIG. 1B, showing a fourth embodiment of bladder assembly 120C. As shown, bladder assembly 120C comprises one bladder 122 connected to at least one of plate 92A and bottom plate 40 via membrane or bag or enclosure 130. In an exemplary embodiment, bladder 122 is at least partially enclosed by membrane 130, which is connected to plate 92A and/or bottom plate 40 via hinge 126, a fastener, adhesive or the like. Membrane 130 may comprise a hole in a lateral wall thereof such that a tube may fluidly connect bladder 122 with pump system 160. The hole in the lateral wall also allows bladder 122 to be removable from membrane 130.

Figure 12:
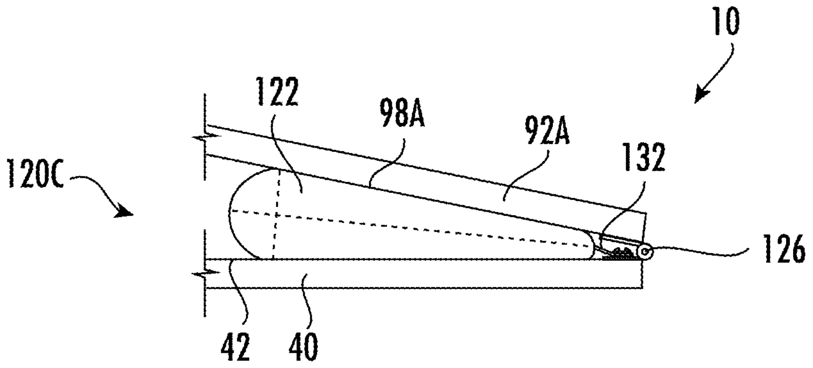
FIG. 12 is a partial cross-sectional view of the lifting assembly taken generally along line 7-7 in FIG. 1B, showing a fifth embodiment of a bladder assembly.

FIG. 12 is a partial cross-sectional view of lifting assembly 10 taken generally along line 7-7 in FIG. 1B, showing a fifth embodiment of bladder assembly 120C. As shown, bladder assembly 120C comprises one or more bladders 122 connected to at least one of plate 92A and bottom plate 40 via a single tether 132. In an exemplary embodiment, tether 132 is connected at a first end to bladder 122 and at a second end to plate 40, plate 92A, and/or hinge 126.

Figure 13:
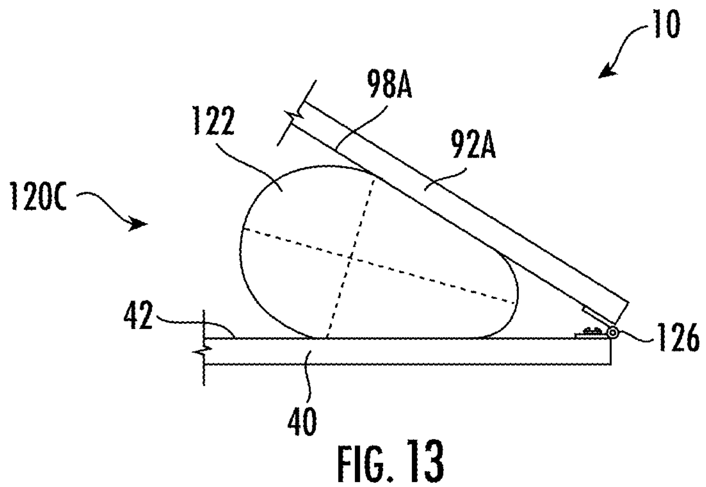
FIG. 13 is a partial cross-sectional view of the lifting assembly taken generally along line 7-7 in FIG. 1B, showing a sixth embodiment of a bladder assembly.

FIG. 13 is a partial cross-sectional view of lifting assembly 10 taken generally along line 7-7 in FIG. 1B, showing a sixth embodiment of bladder assembly 120C. As shown, bladder assembly 120C comprises bladder 122 directly connected to plates 92A and bottom plate 40. In an exemplary embodiment, bladder 122 is connected to inner surface 92A and top surface 42 via any suitable means, for example, adhesive.

It should be appreciated that any of the bladder assemblies shown can be used in any of the embodiments of lifting assembly 10 and in any combination. Furthermore, the tethers and/or membranes can be connected via any suitable means, for example, adhesive, screws, bolts, clamps, dowels, welding, soldering, and the like.

FIG. 14 is a perspective view of user 8 on lifting assembly 10 in the contracted state. User 8 is able to utilize the ramp-like arrangement of plate 72A to slide onto top plate 20 and grasp handles 140. Guard 142 protects the hands of user 8 from being pinched between plates.

FIG. 15 is a perspective view of user 8 on lifting assembly 10 in the expanded state. As shown, one or more bladders or bladder assemblies (not shown) have been expanded or inflated, for example via pump system 160 and one or more conduits, thereby raising user 8.

FIG. 16 is a side elevational view of user 8 transporting lifting assembly 10, in the contracted state. User 8 may use handle 180 to lift one end of lifting assembly 10 such that wheels 152 engage ground surface 1. In an exemplary embodiment, handle 180 may be connected to plate 72B.

Figure 17:
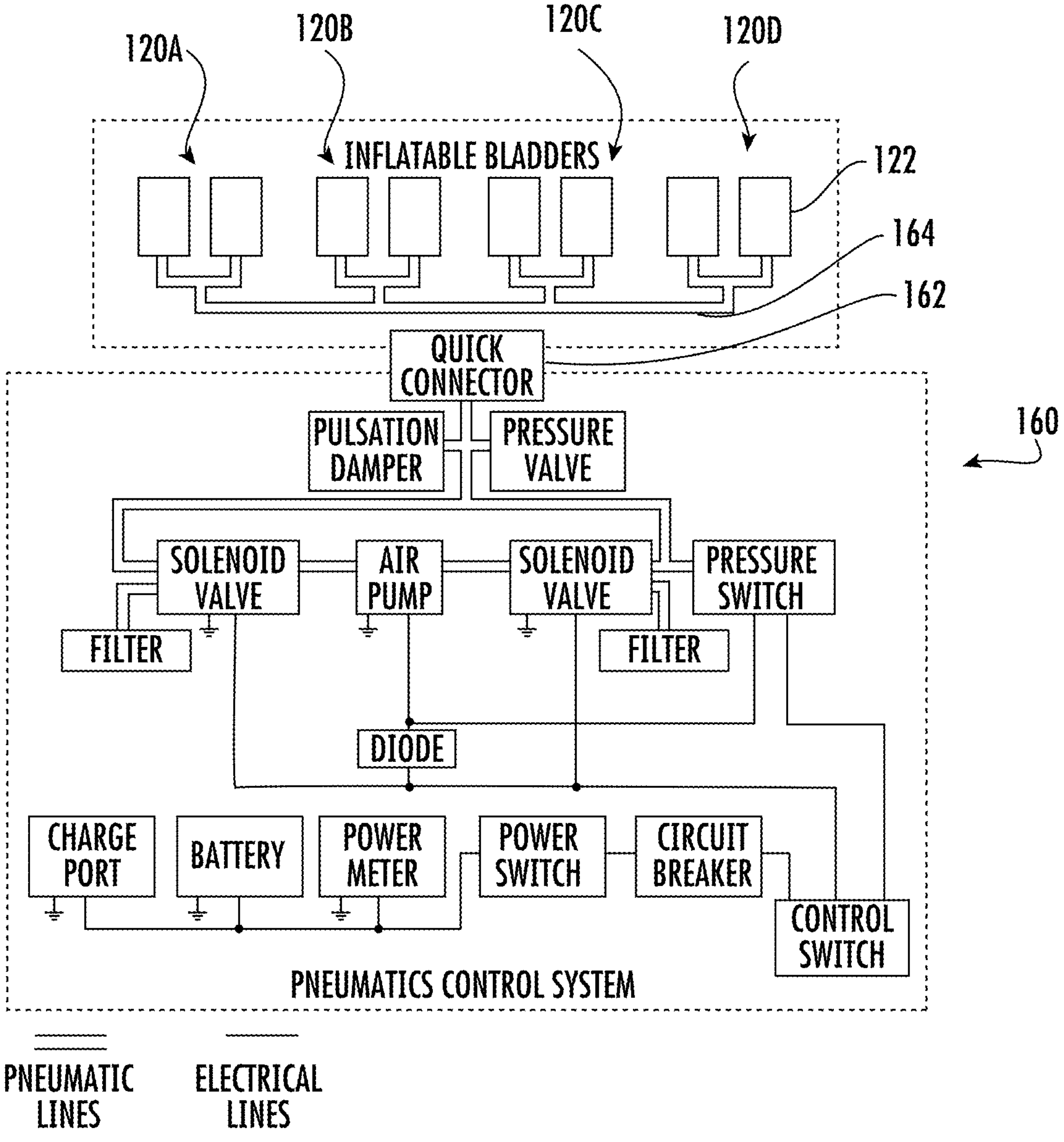
FIG. 17 is a schematic view of the lifting assembly shown in FIG. 1A.

FIG. 17 is a schematic view of lifting assembly 10. As shown, pump system 160 is fluidly connected to one or more bladder assemblies 120A-120D and/or one or more bladders 122 via one or more tubes, for example, tube or quick connect conduit 162 and or manifold 164. Pump system 160 is operatively arranged to inflate and deflate bladders 122 to expand and contract lifting assembly 10, respectively.

In an exemplary embodiment, pump system 160 comprises at least one of a pulsation damper, pressure valve, at least one solenoid valve and corresponding filter, an air pump, a pressure switch, a diode, a charge port, a battery, a power meter, a power switch, a circuit breakers, and a control switch. In an exemplary embodiment, pump system 160 is a pneumatic pump and is connected to pneumatic lines and/or electrical lines.

Figure 18A:
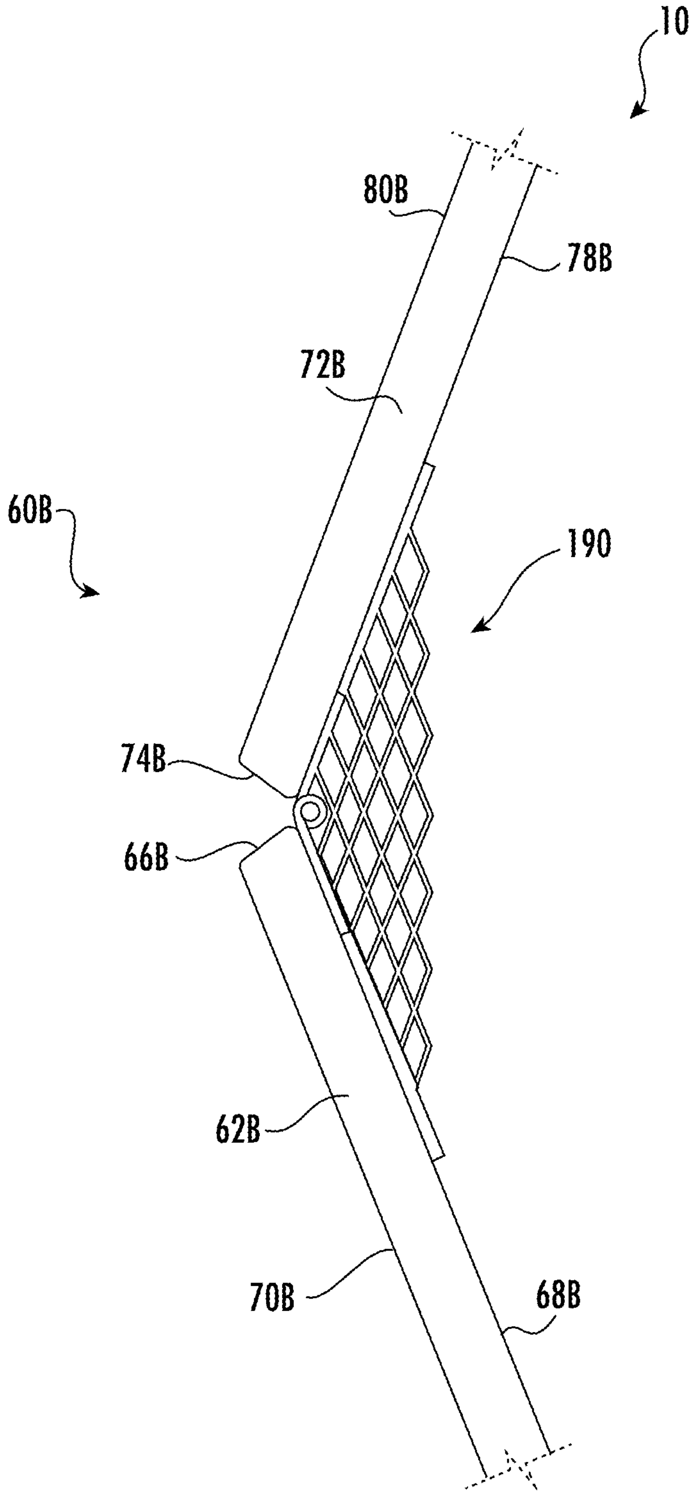
FIG. 18A is a partial side elevational detail view of the lifting assembly shown in FIG. 1A.
Figure 18B:
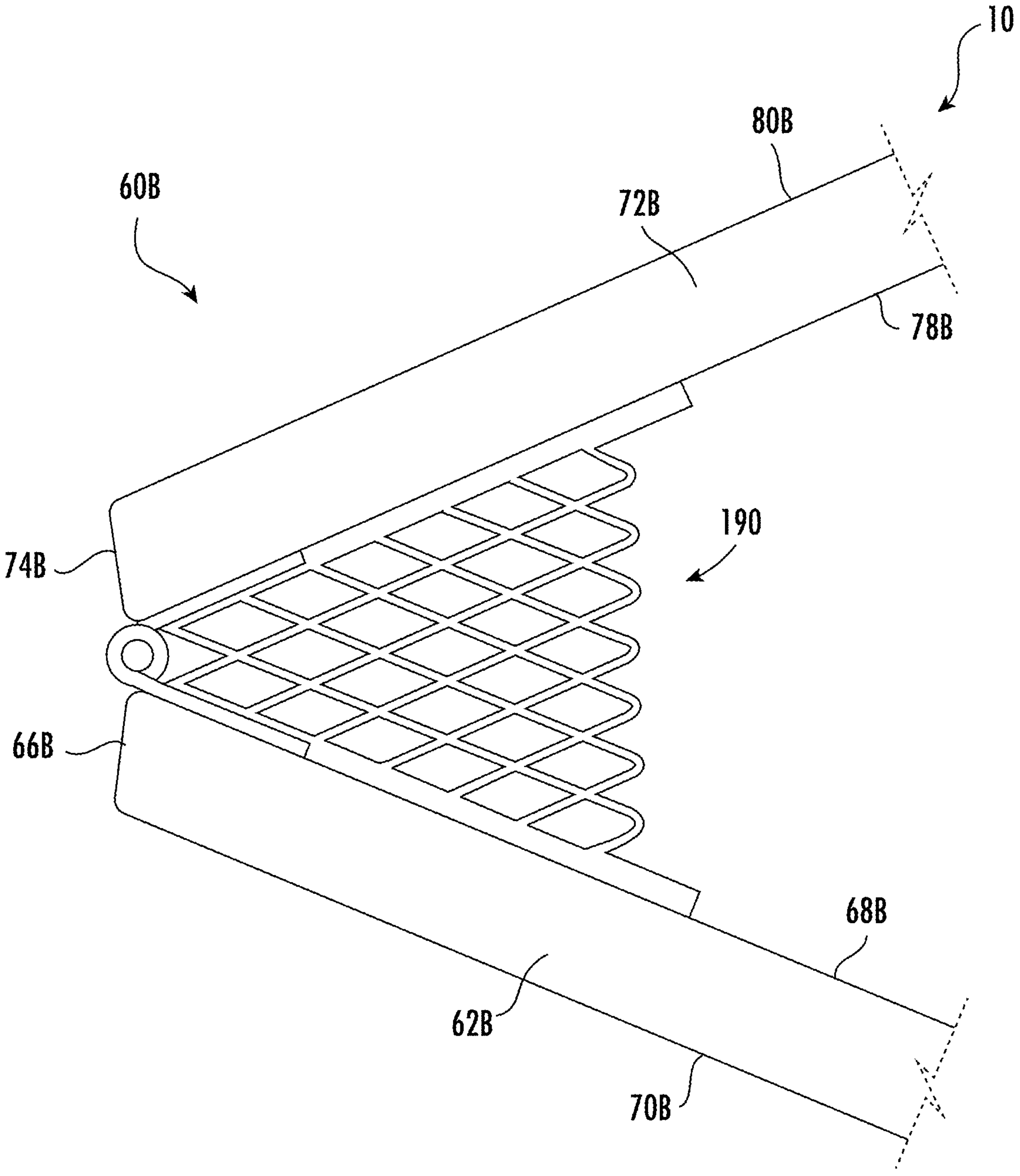
FIG. 18B is a partial side elevational detail view of the lifting assembly shown in FIG. 1A, in a contracted state.

FIG. 18A is a partial side elevational detail view of lifting assembly 10. FIG. 18B is a partial side elevational detail view of lifting assembly 10, in a contracted state. As shown, in an exemplary embodiment lifting assembly 10 may comprise guard or shield 190. Guard 190 is arranged proximate an edge of pivoting plate assembly 60B, 60A to prevent a user's fingers/hands from being pinched between plate 72B, 72A and plate 62B, 62A, for example proximate the hinge. In an exemplary embodiment, guard 190 is a collapsible guard comprising a pliable material, for example, thermoplastic polyurethane or polypropylene. The guard 190 may be formed using plastic extrusion or injection molding. In an exemplary embodiment, guard 190 comprises flat sheets of material that are connected (e.g., sewed or bonded) to form a collapsible honeycomb type structure. As best shown in FIG. 1A, guard 190 is arranged near the edge or edges of pivoting plate assembly 60B, 60A, which will prevent the user's hands from entering the interior of pivoting plate assembly 60B, 60A. For example, each pivoting plate assembly 60A, 60B may include two guards 190, one on either edge. Similarly, pivoting plate assembly 90A, 90B may comprise one or more guards 190.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

1 Ground surface
2 Axis
4 Plane
6 Plane
8 User
10 Lifting assembly
20 Top plate
22 Top surface
24 Bottom surface
26 Side
28 Side
30 Side
32 Side
34 Hole
36 Hole
40 Bottom plate
42 Top surface
44 Bottom surface
46 Side
48 Side
50 Side
52 Side
60A Pivoting plate assembly
60B Pivoting plate assembly
62A Plate
62B Plate
64A End
64B End
66A End
66B End
68A Inner surface
68B Inner surface
70A Outer surface
70B Outer surface
72A Plate
72B Plate
74A End
74B End
76A End
76B End
78A Inner surface
78B Inner surface
80A Outer surface
80B Outer surface
90A Pivoting plate assembly
90B Pivoting plate assembly
92A Plate
92B Plate
94A End
94B End
96A End
96B End
98A Inner surface
98B Inner surface
100A Outer surface
100B Outer surface
102A Plate
102B Plate
104A End
104B End
106A End
106B End
108A Inner surface
108B Inner surface
110A Outer surface
110B Outer surface
120A Bladder assembly
120B Bladder assembly
120C Bladder assembly

120D Bladder assembly
120E Bladder assembly
120F Bladder assembly
122 Bladder
123 Hole(s)
124A Tether
124B Tether
124C Tether
124D Tether
126 Hinge
128A Connector
128B Connector
130 Membrane
130A Membrane
130B Membrane
132 Tether
140 Handle
142 Guard or shield
144 Fasteners
150 Bracket
152 Wheel
160 Pump system
162 Tube
164 Manifold
166 Tube(s)
170 Male connector
172 Female connector
180 Handle
190 Guard or shield
AD1 Axial direction
AD2 Axial direction
H1 Height
H2 Height
RD1 Radial direction
RD2 Radial direction
α Angle

What is claimed is:

1. A lifting assembly, comprising:
a top plate;
a bottom plate;
a first pivoting plate assembly including a first plate pivotably connected to the top plate and a second plate, the second plate including a first end pivotably connected to the first plate and a second end pivotably connected to the bottom plate;
a second pivoting plate assembly including a third plate pivotably connected to the top plate and a fourth plate pivotably connected to the third plate and the bottom plate; and
a first bladder assembly engaged with the second plate and the bottom plate, the first bladder assembly operatively arranged to be inflated and deflated to displace the top plate with respect to the bottom plate;
wherein in an inflated state of the first bladder assembly, the first bladder assembly is arranged completely between the first end and the second end.

2. The lifting assembly as recited in claim 1, wherein:
the first pivoting plate assembly is connected to the top plate proximate a first side of the top plate;
the second pivoting plate assembly is connected to the top plate proximate a second side of the top plate; and
the first side is adjacent to the second side.

3. The lifting assembly as recited in claim 1, wherein:
the first pivoting plate assembly extends radially outward from a perimeter of the top plate in a collapsed state; and
the second pivoting plate assembly extends radially inward from the perimeter of the top plate in the collapsed state.

4. The lifting assembly as recited in claim 3, wherein the first plate forms a ramp surface in the collapsed state.

5. The lifting assembly as recited in claim 1, further comprising a second bladder assembly engaged with the first plate and the top plate, the second bladder assembly operatively arranged to be inflated and deflated to displace the top plate with respect to the bottom plate.

6. The lifting assembly as recited in claim 1, further comprising at least one handle connected to the top plate.

7. The lifting assembly as recited in claim 1, wherein the first bladder assembly comprises at least one bladder connected to at least one of the second plate and the bottom plate.

8. The lifting assembly as recited in claim 7, wherein the at least one bladder is at least partially enclosed by a membrane, and the membrane is fixedly secured to the at least one of the second plate and the bottom plate.

9. The lifting assembly as recited in claim 8, wherein the membrane comprises a lateral wall comprising a hole.

10. The lifting assembly as recited in claim 7, wherein the at least one bladder is connected to the second plate and/or the bottom plate by a tether.

11. The lifting assembly as recited in claim 1, further comprising a pump assembly fluidly connected to the first bladder assembly, the pump assembly operatively arranged to controllably inflate and deflate the first bladder assembly.

12. The lifting assembly as recited in claim 1, further comprising one or more wheels rotatably connected to the first plate.

13. The lifting assembly as recited in claim 1, further comprising a guard arranged proximate an edge of at least one of the first pivoting plate assembly and the second pivoting plate assembly.

14. The lifting assembly as recited in claim 1, wherein in the inflated state the first bladder assembly is arranged between and spaced apart from the first end and the second end.

15. The lifting assembly as recited in claim 1, wherein in a collapsed state the bottom plate, the second plate, and the fourth plate are aligned linearly.

16. A lifting assembly, comprising:
a top plate;
a bottom plate;
a first pivoting plate assembly, including:
a first plate pivotably connected to the top plate proximate a first side of the top plate; and
a second plate pivotably connected to the first plate and the bottom plate;
a second pivoting plate assembly, including:
a third plate pivotably connected to the top plate proximate a second side of the top plate, the second side being adjacent to the first side; and
a fourth plate pivotably connected to the third plate and the bottom plate; and
a first bladder assembly engaged with the second plate and the bottom plate, the first bladder assembly operatively arranged to be inflated and deflated to displace the top plate with respect to the bottom plate;
wherein:
the first pivoting plate assembly extends radially outward from a perimeter of the top plate in a collapsed state of the lifting assembly; and the second pivoting plate assembly extends radially inward from the perimeter of the top plate in the collapsed state.

17. The lifting assembly as recited in claim 16, wherein the first plate forms a ramp surface in the collapsed state.

18. The lifting assembly as recited in claim 16, further comprising a second bladder assembly engaged with the first plate and the top plate, the second bladder not engaged with the bottom plate, the second bladder assembly operatively arranged to be inflated and deflated to displace the top plate with respect to the bottom plate.

19. The lifting assembly as recited in claim 16, wherein in an expanded state of the lifting assembly the first bladder assembly is spaced apart from the top plate.

* * * * *